Aug. 18, 1942.  W. BEEHLER  2,293,530
COMBINATION PILLOW AND DRESSING CASE
Filed Sept. 29, 1939   3 Sheets-Sheet 1
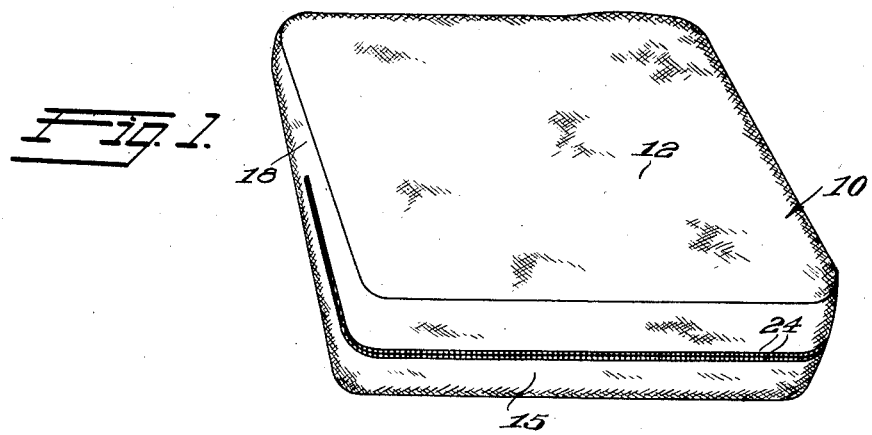
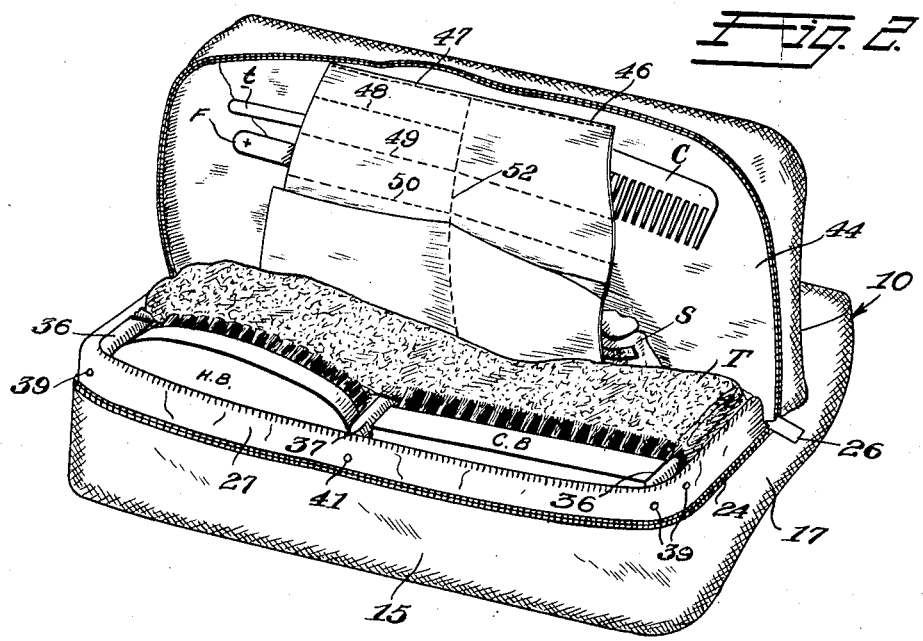
Inventor
William Beehler
By Everett Clements
Attorney Aug. 18, 1942.                W. BEEHLER                2,293,530
                     COMBINATION PILLOW AND DRESSING CASE
                         Filed Sept. 29, 1939        3 Sheets-Sheet 2
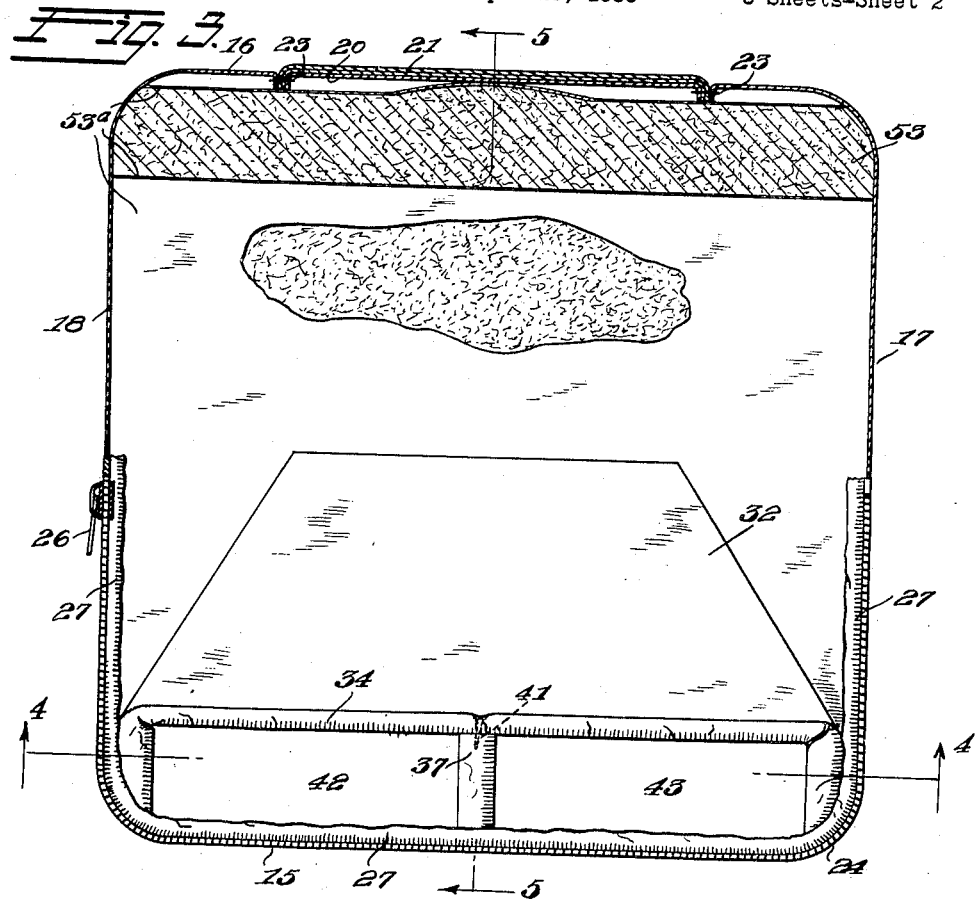
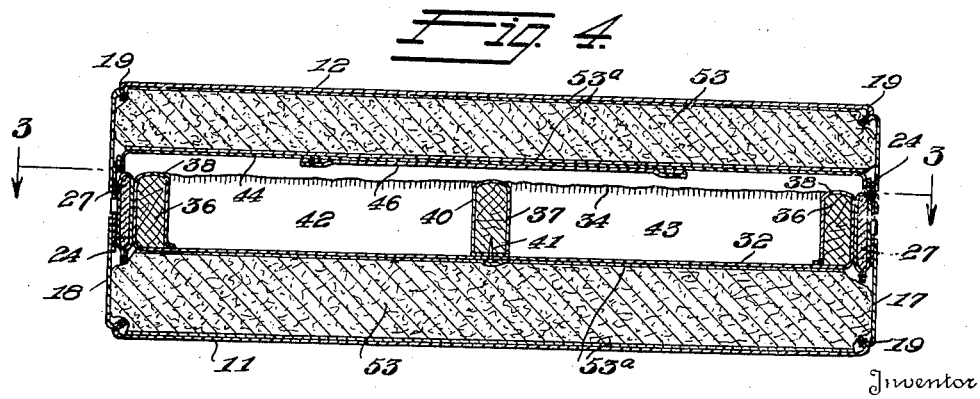

Aug. 18, 1942.  W. BEEHLER  2,293,530
COMBINATION PILLOW AND DRESSING CASE
Filed Sept. 29, 1939  3 Sheets-Sheet 3
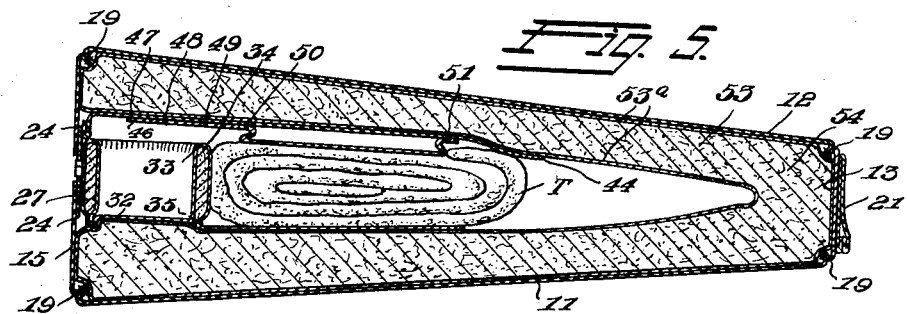
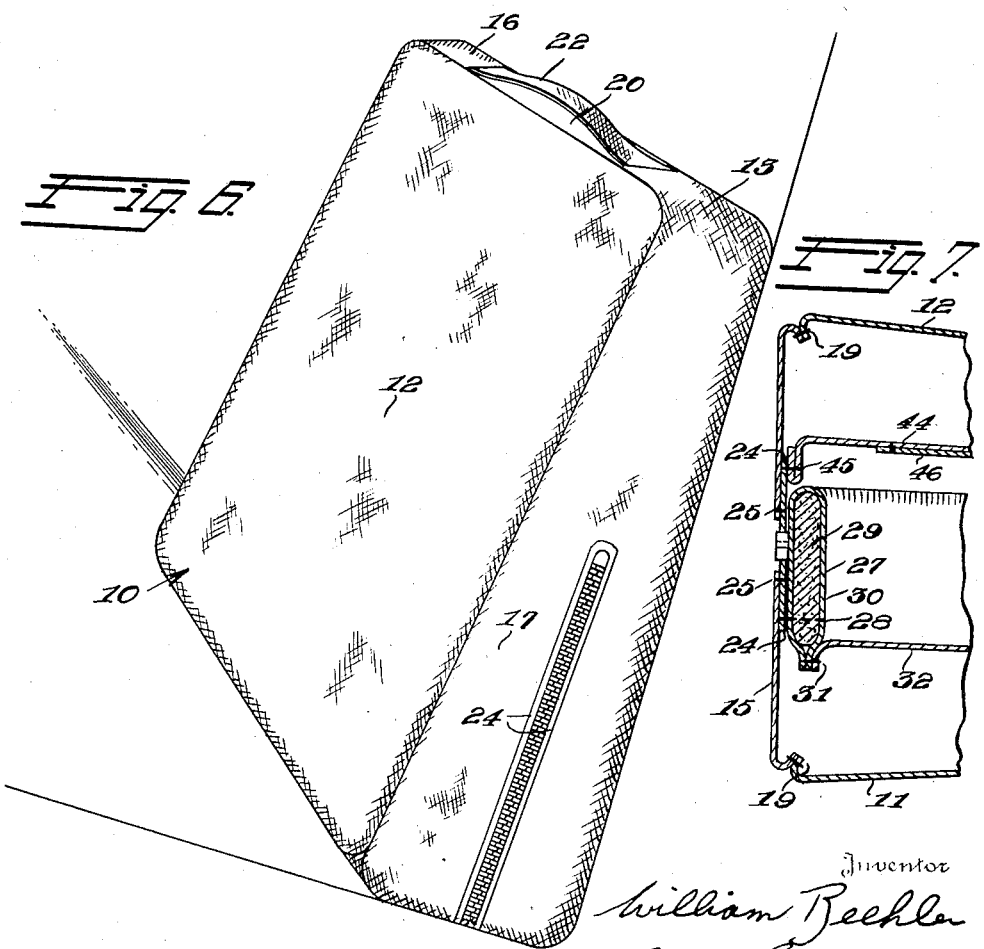
Inventor
William Beehler
By Everett Clements
Attorney Patented Aug. 18, 1942

2,293,530

UNITED STATES PATENT OFFICE 2,293,530

COMBINATION PILLOW AND DRESSING CASE

William Beehler, Baltimore, Md., assignor of one-half to Grace Welch Beehler, Ruxton, Md.

Application September 29, 1939, Serial No. 297,179

5 Claims. (Cl. 190—41)

This invention relates to a combination cushion and dressing case.

A primary object of the invention is the provision of a novel article in the form of a cushion particularly adapted for use as a back support or rest for drivers and other occupants of motor vehicles, and which also functions as a dressing case wherein toilet and sundry articles may be carried for ready use at any desired time or place.

A further object of the invention is the provision of a combination cushion and dressing case which is wider at one edge than at an opposite edge thereof thereby well adapting same for use in connection with the seats of motor vehicles by placing the wider edge thereof adjacent the junction of the base and back of the seat and forming in said wide end portion compartments for the relatively rigid toilet and sundry articles, the cushion thus constructed and in such position for use offering maximum comfort to the driver or other occupant of the vehicle.

A still further object of the invention is the provision of the combination cushion and dressing case which embodies a flexible outer cover having a handle at one edge thereof for transporting same and having a readily closable opening at another edge thereof for access to the interior thereof, novel means being provided in the interior for supporting toilet and sundry articles.

A still further object of the invention is the provision of a combination cushion and dressing case which is simple in construction, neat in appearance, which offers maximum comfort as a motor vehicle cushion, and which provides convenient and readily accessible compartments in the interior thereof for supporting relatively rigid toilet and sundry articles without reducing the normal and required resiliency of such a cushion.

For more complete understanding of the nature and objects of the invention, reference will now be had to the following detailed description, taken in conjunction with the accompanying drawings, wherein—

Fig. 1 is a perspective view of the combination cushion and dressing case in accordance with a preferred embodiment of the invention.

Fig. 2 is a similar view with the case in open position and disclosing the novel interior construction for supporting various toilet articles.

Fig. 3 is a horizontal sectional view as observed in a plane substantially as represented by the line 3—3 in Fig. 4.

Fig. 4 is a transverse sectional view as observed in a plane substantially as represented by the line 4—4 in Fig. 3.

Fig. 5 is a similar view but at right angles to that of Fig. 4 and as observed in a plane as represented by the line 5—5 in Fig. 3.

Fig. 6 is a perspective view of the improved article in use as a cushion on a motor vehicle seat represented diagrammatically, and Fig. 7 is an enlarged view of the left hand end of Fig. 5 with certain elements omitted for clearness of illustration.

Referring now in detail to these drawings by reference characters, and wherein like characters designate like parts in the different views, 10 designates the improved article in its entirety and which comprises spaced opposite side portions 11 and 12 and a perimetrical portion 13 embodying opposed parallel edges 15 and 16 and other opposed parallel edges 17 and 18. The sides and edges provide the outer cover of body portion of the combination cushion and dressing case and are preferably connected together by lines of stitching extending through inturned lapped marginal edges of the sides and edge portion, as is represented at 19.

The outer cover may be formed of any desired fabric or other similar flexible material which will withstand substantial wear and maintain a good appearance.

The edges 15 and 16 are of uniform length but the former is substantially wider than the latter and the edges 17 and 18 each taper from the edge 15 to the edge 16 thereby providing a cushion which is substantially of truncated isosceles triangular form in transverse section parallel with the edges 17 and 18, for a purpose later to appear.

The edge portion 13 embodying the angularly related edges 15, 16, 17 and 18 is a single strip of material and the narrower edge 16 further includes a strip of fabric 20 upon which is superposed a double thickness fabric strip 21 which functions as a handle 22 (see particularly Fig. 6). The strips 16, 20 and 21 have their adjacent edges turned inwardly and united by lines of stitching as indicated at 23 (Fig. 3).

The wider edge 15 together with the adjacent ends of the edges 17 and 18 is slit, the slit extending longitudinally of the edge 15 and substantially one half the length of the opposed edges 17 and 18, as is clearly indicated in the drawings.

A "zipper" tape 24 is secured, as by lines of stitches 25, to the opposed fabric edges defined by the slit, thus providing means for readily opening or closing the opening in the outer cover, formed by such slit. A slide member 26 cooperates with the opposed "zipper" tapes as in well known practice.

A semi-rigid strip 27 extends the full length of the opening or slit and is secured to the lower "zipper" strip 24 by a line of stitches 28. This strip 27 comprises a core 29 composed of a strip of felt paperboard or like supporting material which is enclosed by a strip of leather or similar flexible material 30 which is looped around the core and has its lower edges abutted and secured together by a line of stiches 31.

A flap 32 (preferably of leather) extends from the bottom of the strip 27 toward the narrow edge 16, terminating substantially at the ends of the strip 27. This flap 32 has its forward edge turned into engagement with the edges of the leather strip 30 and secured thereto by the aforementioned lines of stitches 31. The flap 32, intermediate its secured and free edges and relatively close to the former, is looped as indicated at 33 (Fig. 5) which loop encloses another semi-rigid strip 34, the portions of the flap at the base of the strip 34 being connected by a line of stitches 35.

Interposed between the strips 27 and 34 are blocks 36 adjacent the opposed edges 17 and 18 and an intermediate block 37.

The leather flap 32 is looped at its ends around the blocks 36 as indicated at 38 and the blocks 36 are preferably secured to the opposite parallel portions of the strip 27 by nails 39 (Fig. 2).

The block 37 is also covered by a leather strip 40 and this block is secured to the strips 27 and 34 as well as the flap 32 by nails 41.

Both of the blocks 36 and 37 may be of any desired relatively stiff material but are preferably constructed of wood or paperboard. The structure defined by the strips 27 and 34, blocks 36 and 37 and the flap 32 forms a pair of adjacent pockets 42 and 43 well adapted to snugly receive a hair brush H. B. and clothes brush C. B. respectively, as is clearly shown in Fig. 2.

A second flap 44 is disposed above the strips 27 and 34 and has its front and opposite side edges doubled over and secured to the upper "zipper" tape 24, as by a line of stitches 45, the free edge of the flap 44 terminating somewhat beyond the corresponding edge of the flap 32.

A sheet of material such as leather 46 is secured to the flap 44 on the side thereof adjacent the strips 27 and 34 as by parallel lines of stitches 47, 48, 49, 50 and 51 as well as a line of stitches 52 at right angles to the first lines of stitches and substantially centrally of the opposite edges of the sheet.

The sheet thus secured provides receiving pockets for such articles as a comb C, tooth brush t, nail file F, soap S, etc.

It is to be noted that the flaps 32 and 44 are substantially spaced from each other as well as from the outer cover sides 11 and 12.

A cushioning pad or batting 53 is folded over as at 54 with the opposed portions thereof disposed between the sides 11 and 12 and the flaps 32 and 44 respectively and this pad may comprise fibrous material interposed between paper sheets 53a. As will clearly be seen from Fig. 5 a substantial space is thus provided between the flaps 32 and 44 rearwardly of the strip 34 which is well adapted for supporting a towel T, wash rags or other similar articles.

It will be readily appreciated from the foregoing detailed disclosure that a combination cushion and dressing case is provided in accordance with this invention which substantially meets the requirement of motorists, both from the standpoint of comfort while driving and by providing ready access to necessary toilet articles, for improving one's personal appearance after long drives, etc.

Thus, with the cushion closed by the "zipper" fastener it may be grasped by the handle 22 and easily transported as a bag or case and furthermore the relatively small size of this article adapts it for storage in a relatively small space when its use is not required.

In the use of the improved article as a cushion, however, it may be positioned adjacent the back of a seat, as represented in Fig. 6, and due to its tapered form edgewise considered, it will provide a proper rest for a motorist's back which will enable him to proceed on his journey with greater comfort and with resulting less fatigue when his journey is ended.

Whenever it is desired to groom one's self the cushion may be readily opened as a case by operating the slide 26, whereupon the side 12 may be raised, as indicated in Fig. 2, for access to the various toilet or sundry articles therewithin.

While I have disclosed but a single specific embodiment of my invention, such is to be considered as illustrative only, and not restrictive, the scope of the invention being defined in the claims.

What I claim and desire to secure by U. S. Letters Patent is:

1. A combined cushion and dressing case comprising an outer cover having rectangular side portions, the opposed faces of which are inclined from a relatively wide base edge portion to a relatively narrow top edge portion and connected at the ends by tapering end edge portions, said base and end edge portions having a continuous slit extending centrally thereof from points approximately midway of the lengths of said end edge portions and defining an opening to the interior of said case across the bottom edge of the case, spaced flap members secured to the base and end edge portions along each side of said slit and extending into said case in opposed parallel spaced relation to the sides of the case defining therebetween an enclosing space which tapers in thickness toward the narrow top edge of said case, padding sections disposed between said flaps and the parallel spaced opposed faces of said case sides, and an article supporting pocket carried by one of said flap members adjacent said opening slit and extending into the tapering space between said padding sections.

2. The structure defined in claim 1 wherein certain of said article supporting pockets are provided by spaced semi-rigid strips and interposed spaced blocks secured to one of the flap members and a fabric sheet secured to the other flap member by spaced parallel lines of stitches.

3. A combination cushion and dressing case comprising an outer fabric cover including spaced side portions and opposed edge portions, the cover being rectangular in plan and enclosing a space tapering in thickness from a wider edge of the cover to an opposed narrower edge thereof, the wider edge and portions of the adjacent edges having a slit therein for providing access to the interior of the cover, a fastener tape secured to the edges at each side of the slit, a flap secured to one of the tapes and having a fabric sheet stitched thereto for providing article receiving pockets, a semi-rigid strip secured to the other tape, a flap secured to the strip, a second semi-rigid strip spaced from a parallel portion of the first strip and supported by the second flap, and blocks supported between the strips for providing in conjunction therewith article receiving pockets.

4. The structure defined in claim 3 wherein said blocks are secured to said strips and wherein said second flap encloses certain of the blocks.

5. The structure defined in claim 3 wherein said flaps are in spaced relation to said side portions, and a doubled over sheet or padding having its opposed portions disposed between the flaps and the adjacent side portions, the padding sheet defining in cooperation with the second named semi-rigid strip a pocket for towels or the like.

WILLIAM BEEHLER.